US011828183B2

(12) United States Patent
Levisse et al.

(10) Patent No.: US 11,828,183 B2
(45) Date of Patent: Nov. 28, 2023

(54) PRESSURISING OF LUBRICATION CHAMBERS IN A TURBOMACHINE WITH COUNTER-ROTATING TURBINE

(71) Applicant: Safran Aircraft Engines, Paris (FR)

(72) Inventors: Paul Ghislain Albert Levisse, Paris (FR); Olivier Belmonte, Paris (FR); Fabien Roger Gaston Caty, Paris (FR); Amelie Argie Antoinette Chassagne, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/783,629

(22) PCT Filed: Dec. 1, 2020

(86) PCT No.: PCT/FR2020/052230
§ 371 (c)(1),
(2) Date: Jun. 8, 2022

(87) PCT Pub. No.: WO2021/116556
PCT Pub. Date: Jun. 17, 2021

(65) Prior Publication Data
US 2023/0008678 A1    Jan. 12, 2023

(30) Foreign Application Priority Data
Dec. 10, 2019    (FR) ...................................... 1914017

(51) Int. Cl.
*F01D 1/24*    (2006.01)
*F01D 11/00*    (2006.01)
*F01D 25/00*    (2006.01)

(52) U.S. Cl.
CPC .............. *F01D 1/24* (2013.01); *F01D 11/005* (2013.01); *F01D 25/00* (2013.01); *F05D 2260/40311* (2013.01); *F05D 2260/98* (2013.01)

(58) Field of Classification Search
CPC .......... F01D 1/24; F01D 11/005; F01D 11/00; F01D 25/00; F05D 2260/40311; F05D 2260/98
See application file for complete search history.

(56) References Cited

U.S. PATENT DOCUMENTS

| 8,015,798 | B2* | 9/2011 | Norris | ..................... F02C 3/067 |
| | | | | 60/268 |
| 9,022,725 | B2* | 5/2015 | Merry | ....................... F02C 7/32 |
| | | | | 415/69 |

(Continued)

FOREIGN PATENT DOCUMENTS

| EP | 2820280 | 1/2015 |
| WO | 2017158296 | 9/2017 |

OTHER PUBLICATIONS

Cuviller, Romain, et al., "Turbojet Engine Comprising a Simplified Bearing Lubrication Unit," Sep. 21, 2019, WIPO, 1-6 (Year: 2017).*

(Continued)

*Primary Examiner* — Sabbir Hasan
*Assistant Examiner* — Joshua R Beebe
(74) *Attorney, Agent, or Firm* — Kilpatrick Townsend & Stockton LLP (57) ABSTRACT

Disclosed is a turbomachine (10) with counter-rotating turbine for an aircraft, comprising: —a high-pressure body, —a low-pressure counter-rotating turbine (22), —a planetary-type mechanical epicyclic reduction gear (42), —a guide bearings (56-62) for the turbine shafts (36, 38), characterised in that said reduction gear (42) and certain of the bearings (60, 62) are housed in a lubrication chamber (Continued)

(86) supplied with oil and comprising dynamic seals (86*a*-86*d*), and in that the turbomachine comprises circuits (C1, C2) for pressurising these seals.

15 Claims, 7 Drawing Sheets

(56) References Cited

U.S. PATENT DOCUMENTS

| | | |
|---|---|---|
| 2018/0223732 A1 | 8/2018 | Clements et al. |
| 2019/0085701 A1 | 3/2019 | Pankaj et al. |
| 2019/0085724 A1 | 3/2019 | Cuvillier et al. |

OTHER PUBLICATIONS

International Patent Application No. PCT/FR2020/052230, International Search Report dated Mar. 16, 2021, 2 pages.

* cited by examiner

PRESSURISING OF LUBRICATION CHAMBERS IN A TURBOMACHINE WITH COUNTER-ROTATING TURBINE

TECHNICAL FIELD OF THE INVENTION

The present invention relates to a turbomachine with counter-rotating turbine for an aircraft, this turbomachine comprising circuits for pressurizing seals of lubrication chambers, in particular bearings.

TECHNICAL BACKGROUND

The technical background comprises in particular the documents US-A1-2019/085701, US-A1-2018/223732, EP-A2-2 820 280 and WO-A1-2017/158296.

Typically, an aircraft turbomachine comprises, from upstream to downstream in the flow direction of the gases, a fan, a low-pressure compressor, a high-pressure compressor, an annular combustion chamber, a high-pressure turbine and a low-pressure turbine. The rotor of the low-pressure compressor is driven by the rotor of the low-pressure turbine, and the rotor of the high-pressure compressor is driven by the rotor of the high-pressure turbine.

From an engine performance and fuel consumption point of view, it is advantageous to maximize the rotational speed of the low-pressure turbine as this allows to obtain a better efficiency of the turbine. However, increasing the rotational speed of the turbine implies increasing the centrifugal forces it undergoes, and therefore greatly complicates its design.

One suggestion for increasing the efficiency of a turbine without increasing its rotational speed consists in using a counter-rotating turbine. The low-pressure turbine is then replaced by a two-rotor turbine a first rotor of which is configured to rotate in a first rotational direction and is connected to a first turbine shaft, and a second rotor is configured to rotate in an opposite direction of rotation and is connected to a second turbine shaft. The first rotor comprises turbine wheels interposed between turbine wheels of the second rotor.

A low-pressure turbine can have a rotational speed at take-off of about 4,000 rpm in a conventional architecture where the turbine drives the fan directly or a rotational speed at take-off of about 10,000 rpm in an architecture where the turbine drives the fan by means of a reduction gear. Its replacement by a counter-rotating turbine whose rotors turn respectively at speeds at take-off of the order of 3,000 and 7,000 rpm allows to have a relative speed of 10,000 rpm (3000+7000) while having an absolute speed in a low range of the aforementioned speed interval.

This counter-rotating turbine comprises a slow rotor and a fast rotor, the slow rotor driving the fan and the fast rotor meshing with a mechanical reduction gear with an epicyclic gear train of the planetary type whose input and output are counter-rotating (rotating ring gear, stationary planet carrier, rotating sun gear).

The reduction gear couples the fast rotor and the slow rotor, allowing thus a power transfer from the fast rotor towards the slow rotor. The higher efficiencies of a high-speed turbine are achieved by transferring a large portion of the power from the turbine towards the fan, without through a reduction gear but through a shaft.

This architecture is complex because of its mechanical integration: the mechanical reduction gear is located downstream of the turbomachine, radially inside a stator casing referred to as exhaust casing.

The shafts of the counter-rotating turbine are guided in rotation by bearings which must be lubricated by oil during operation. The reduction gear is also lubricated with oil.

It is known that the elements to be lubricated of a turbomachine are housed in a lubrication chamber into which oil is injected and in which an oil mist is present under pressure. A lubrication chamber is generally delimited between at least one rotor wall and at least one stator wall, with dynamic seals, such as labyrinth seals, being located between these walls and at the terminals of the chamber. To prevent oil from leaking out of the chamber through the seals, these seals are pressurized, i.e. pressurized air is conveyed from one side of the seal opposite to the inside of the chamber, which causes this pressurizing air to flow through the dynamic seal from the outside to the inside of the chamber, and thus prevents oil from leaking from the inside to the outside of the chamber. An oil leak would be very problematic as it could affect the health of the rotors of the turbine and impact the temperatures of the chambers.

The architecture presented above is also complex due to the implementation of the lubrication chambers of the reduction gear and the bearings for guiding in particular the first and second turbine shafts in rotation. One of the difficulties concerns the pressurization of the chambers and in particular the conveying of the pressurized air from its collection area in the turbomachine to the seals of the chambers.

SUMMARY OF THE INVENTION

The present invention proposes an improvement to the technology described above, which represents a simple, effective and economical solution to at least some of the above problems.

The invention proposes a turbomachine with counter-rotating turbine for an aircraft, comprising:
- a high-pressure body comprising a high-pressure compressor rotor and a high-pressure turbine rotor, these rotors being connected by a high-pressure shaft,
- a low-pressure counter-rotating turbine, a first rotor of which is configured to rotate in a first direction of rotation and is connected to a first turbine shaft, and a second rotor of which is configured to rotate in an opposite direction of rotation and is connected to a second turbine shaft, the first rotor comprising turbine wheels interposed between turbine wheels of the second rotor,
- a mechanical reduction gear with epicyclic gear train of the planetary type which comprises a sun gear driven in rotation by said second shaft, a ring gear driven in rotation by said first shaft, and a planet carrier attached to a first stator casing of the turbomachine located upstream of the counter-rotating turbine with respect to a direction of flow of the gases in the turbomachine,
- first bearings for guiding said first shaft, these first bearings being carried by at least one bearing support attached to a second stator casing located downstream of the counter-rotating turbine, characterised in that said reduction gear and said first bearings are housed in a first lubrication chamber fed with oil and comprising dynamic seals, and in that the turbomachine comprises:
- a first circuit for pressurizing at least one of said seals, the first circuit being configured to convey pressurized air from the external periphery of the high-pressure body to the external periphery of said second casing and then from the external periphery of this casing to its internal periphery and said at least one of said seals, and a second circuit for pressurizing at least one other of said seals, the second circuit being configured to convey pressurized air from the internal periphery of the high-pressure body to the internal periphery of said reduction gear and said at least one other of said seals, passing within said second shaft.

The reduction gear and the first bearings are thus located in a same lubrication chamber which can be sealed by several dynamic seals. The number of these seals is for example 2, 3, 4 or even more. A dynamic seal is for example a labyrinth seal, a segmented radial seal, etc.

The terminals of this chamber are pressurized by two independent air circuits, a first pressurized air circuit which can be considered as an external pressurization circuit insofar as it extends mainly outside the turbine duct, and an internal pressurization circuit which extends inside the turbine duct.

The first circuit is designed to convey pressurized air to certain seals of the chamber by radially passing through the second casing, which extends around the reduction gear and the chamber. The second circuit is designed to convey pressurized air to the other seals of the chamber.

The turbomachine according to the invention may comprise one or more of the following characteristics, taken alone from each other or in combination with each other:
- said first circuit is configured to feed air to at least one first seal, and possibly also to another seal;
- said first circuit comprises at least one air conduit, preferably heat-insulated, passing through at least one tubular arm of said second casing;
- the first seal is formed between said first shaft and an annular support of one of the first bearings for guiding the first shaft, said first circuit comprising through openings formed in this support, these openings feeding said first seal and opening into an annular cavity which is surrounded by said second casing and which is in fluidic communication with said at least one conduit;
- said other seal is formed between said first shaft or a low-pressure shaft coupled to this first shaft, and an annular support of one of the first bearings for guiding the first shaft, said first circuit comprising through openings formed in this support and feeding said other seal;
- said second circuit is configured to feed air to a second seal and a third seal, or even to a fourth seal;
- said second circuit comprises through openings formed in an element for connecting said first casing to the planet carrier of the reduction gear.
- said second seal is formed between said first and second turbine shafts, said second circuit comprising through openings formed in this second shaft for feeding this second seal;
- said third seal is formed between said first shaft or a low-pressure shaft coupled to this first shaft, and the planet carrier of the reduction gear or an element integral with this planet carrier, said second circuit comprising air passages formed in the planet carrier or this element, or between the planet carrier and this element to feed this third seal;
- said fourth seal is formed between said first shaft or a low-pressure shaft coupled to this first shaft, and an annular support of one of the first bearings for guiding the first shaft;
- said second circuit comprises at least one through opening formed in said low-pressure shaft and/or in a fan shaft coupled to the low-pressure shaft and configured to drive a fan of the turbomachine, to feed the fourth seal;
- said fourth seal is not fed with air from the second circuit, a cap being attached to the downstream end of said low-pressure shaft so that the fourth seal is located between two annular spaces intended to be at a same pressure during operation;
- said first and second circuits are configured to collect air from upstream of the high-pressure compressor or from this high-pressure compressor;
- the turbomachine comprises second bearings for guiding said second shaft, these second bearings being carried by at least one bearing support attached to said first stator casing,
- said second bearings are housed in a second lubrication chamber fed with oil and comprising dynamic seals fed with air from said second circuit; and
- said first shaft is coupled to a low-pressure shaft which is guided in rotation by at least one bearing carried by an annular support attached to said first casing, this bearing being housed in a third lubrication chamber fed with oil and comprising dynamic seals fed with air from said second circuit.

Preferably the turbomachine is of the type with a single shrouded fan, the first shaft driving this single fan in rotation.

BRIEF DESCRIPTION OF FIGURES

The invention will be better understood and other details, characteristics and advantages of the present invention will become clearer from the following description made by way of non-limiting example and with reference to the attached drawings, in which.

DETAILED DESCRIPTION OF THE INVENTION

Figure 1:
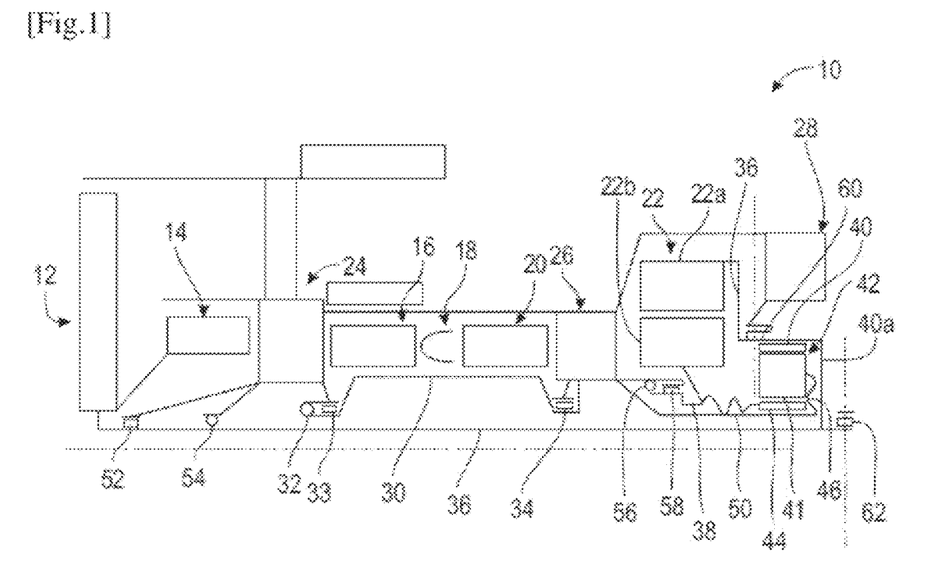
FIG. 1 is a very schematic view of a turbomachine with counter-rotating turbine according to the invention.

FIG. 1 shows a very schematic representation of a turbomachine 10 with counter-rotating turbine for an aircraft.

This turbomachine 10 comprises from upstream to downstream, in the flow direction of the gases, a fan 12, a low-pressure compressor 14, a high-pressure compressor 16, an annular combustion chamber 18, a high-pressure turbine 20 and a counter-rotating turbine 22.

The reference 24 refers to an intermediate casing located between the compressors 14 and 16, and the reference 26 refers to a turbine casing (of the TVF type, an acronym for Turbine Vane Frame, which designate a turbine casing equipped with arms forming straightener bladings) located between the turbines 20 and 22. Finally, the reference 28 designates an exhaust casing (of the TRF type, an acronym for Turbine Rear Frame which designates the last turbine casing). These casings form the structure of the turbomachine: they support the bearings that guide the shafts in rotation and are linked to the suspensions of the turbomachine.

The rotor of the high-pressure turbine 20 drives in rotation the rotor of the high-pressure compressor 16 by a high-pressure shaft 30, which is centred and guided in rotation by bearings, such as an upstream ball bearing 32 and a downstream roller bearing 34. The assembly formed by the rotors of the high-pressure turbine 20 and the high-pressure compressor 16, and the high-pressure shaft 30, forms a high-pressure body. The bearing 32 is mounted between an upstream end of the shaft 30 and the intermediate casing 24, and the bearing 34 is mounted between a downstream end of the shaft 30 and the turbine casing 26.

Figure 2:
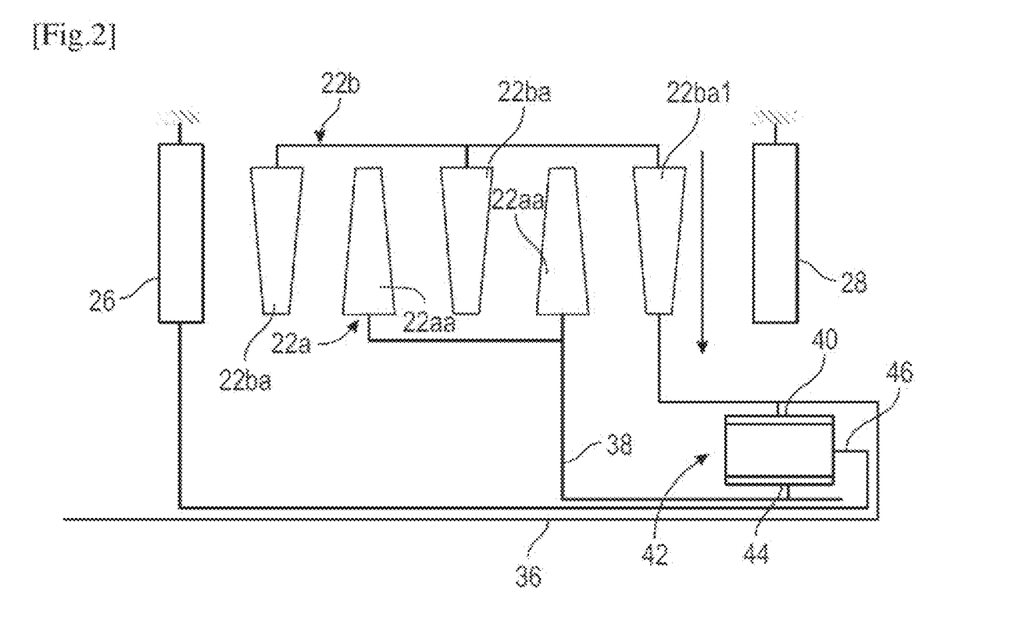
FIG. 2 is a larger scale of the counter-rotating turbine in FIG. 1.

The counter-rotating turbine 22 comprises a first rotor 22a having wheels 22aa configured to rotate in a first direction of rotation and connected to a first turbine shaft 36, and a second rotor 22b having wheels 22ba configured to rotate in an opposite direction of rotation and connected to a second turbine shaft 38 and interposed between the wheels of the rotor 22a (see FIG. 2).

Each turbine wheel comprises an annular row of blades, each of which comprises an aerodynamic profile comprising an intrados and an extrados that meet to form a leading edge and a trailing edge of the gases in the turbine duct.

The first shaft 36 drives in rotation the fan 12 and the rotor of the low-pressure compressor 14. This first shaft 36 is furthermore meshed with a ring gear 40 of a mechanical reduction gear 42 with epicyclic gear train of planetary type.

The second shaft 38 is meshed with the sun gear 44 or planetary of the reduction gear 42.

The reduction gear 42 further comprises planet gears 41 meshed with the sun gear 44 and the ring gear 40, respectively, and carried by a planet carrier 46 that is attached to the turbine casing 26.

Each of the casings 26 and 28 generally comprises a central hub, as well as an outer annulus that surrounds the hub and which is connected to the latter by a series of arms that are substantially radial with respect to the longitudinal axis of the turbomachine and passes through the turbine duct. The central hub of the casing 28 extends around at least one portion of the reduction gear 42.

In the example shown, the high-pressure shaft 30 is centred and guided in rotation by two upstream ball bearings 32 and roller bearings 33, respectively, and by a downstream roller bearing 34. The bearings 32, 33 are mounted between an upstream end of the shaft 30 and the intermediate casing 24, and the bearing 34 is mounted between a downstream end of the shaft 30 and the turbine casing 26.

The planet carrier 46 of the reduction gear 42 is attached to the turbine casing 26. The planet carrier 46 is thus connected to the turbine casing 26 by a cylindrical wall 50 which is advantageously rigid. This wall 50 passes axially through the rotors 22a, 22b and the second shaft 38.

The second shaft 38 has its downstream end meshed with the sun gear, as discussed above, and is further connected to the last stage or downstream stage of the second rotor 22b, i.e., to the last wheel 22ba1 of this rotor.

The second shaft 38 is centred and guided in rotation on this wall 50 by means of two guide bearings, respectively upstream 56 and downstream 58. An example of embodiment of these bearings 56, 58 in more detail in FIGS. 4 and 5.

The first shaft 36 has its downstream end attached to the ring gear 40 of the reduction gear and its upstream end attached to the last stage or downstream stage of the first rotor 22a, i.e. the last wheel of this rotor. The ring gear 40 is further attached to the upstream end of a ring gear carrier 40a the downstream end of which is attached to or meshed with the downstream end of the shaft 36 which is coupled to the drive shaft of the fan 12.

The planet carrier 46 may comprise, here on the downstream side of the reduction gear 42, an annular segment having a cross-section shaped like a C or S so as to confer on the planet carrier a certain flexibility by elastic deformation, in particular in radial direction as well as in tilting (flexibility in rotation about the axes perpendicular to the motor axis). Because of this flexibility provided by the planet carrier 46, the ring gear carrier 40a of the reduction gear 42 can be rigid. The reverse is possible, under certain conditions. In this case, the ring gear carrier 40a would be flexible or confer a flexibility, and the planet carrier 46 would be rigid. The ring gear carrier 40a would then comprise an annular segment with a cross-section shaped like a C or S so as to confer to the ring gear a certain flexibility by elastic deformation, in particular in radial as well as in tilting (flexibility in rotation around axes perpendicular to the motor axis). In this second configuration, the flexibility is advantageously integrated outside the force path from the downstream end of the ring gear carrier 40a to the bearing 60.

The shaft 36 is guided upstream by bearings 52, 54 mounted between this shaft and the intermediate casing 24. A first of these bearings is, for example, an upstream roller bearing 52, and a second of these bearings is, for example, a downstream ball bearing 54.

The shaft 36 is further centred and guided in rotation downstream by two guide bearings, respectively upstream 60 and downstream 62 both supported by the exhaust casing 28. These bearings are advantageously placed on either side of the reduction gear 42. An example of embodiment of these bearings 60, 62 shown in more detail in FIGS. 4 and 6.

Figure 3:
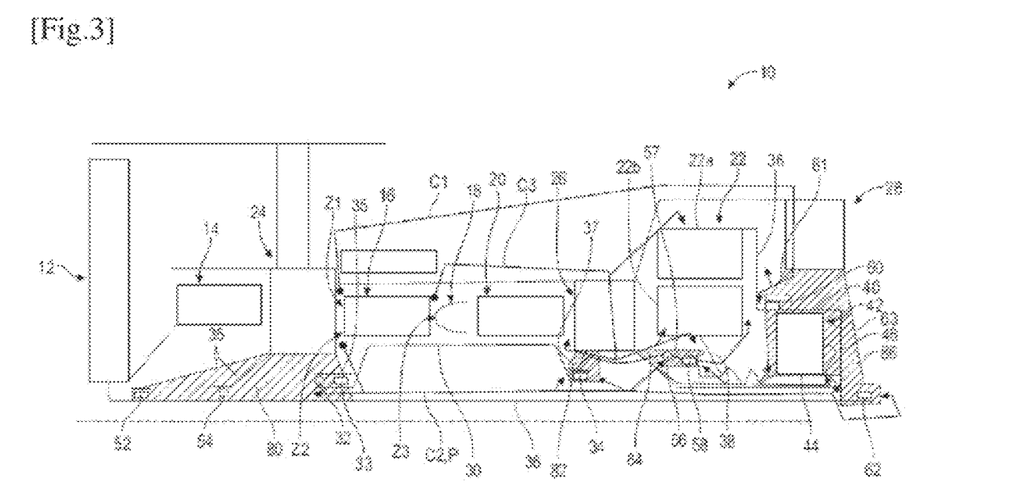
FIG. 3 is a similar view to FIG. 1 and shows pressurization circuits of lubrication chambers of the turbomachine.

FIG. 3 illustrates chambers 80, 82, 84, 86 for lubrication of the reduction gear 42 and bearings 32, 33, 34, 52, 54, 56, 58, 60, 62 of the turbomachine 10.

The bearings 32, 33, 52, 54 are housed in a same lubrication chamber 80 which is located upstream of the turbomachine 10, and delimited on the one hand by annular supports 35 of the bearings 52, 54, 32, 33 and the shaft 36. These annular supports 35 are attached to the intermediate casing 24.

Figure 4:
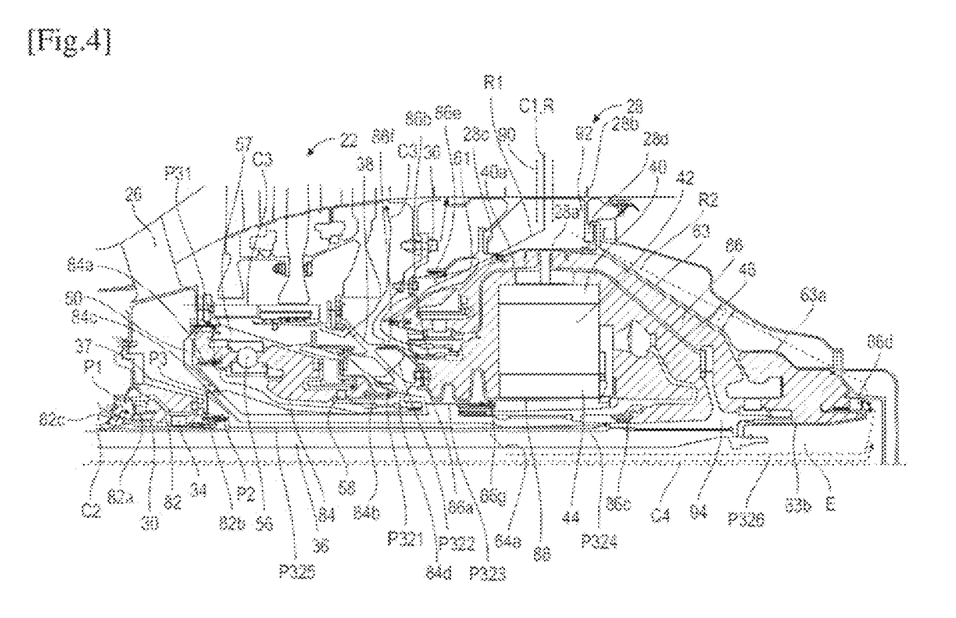
FIG. 4 is a schematic axial sectional view of a more concrete embodiment of a turbomachine according to the invention and also shows pressurization circuits.
Figure 5:
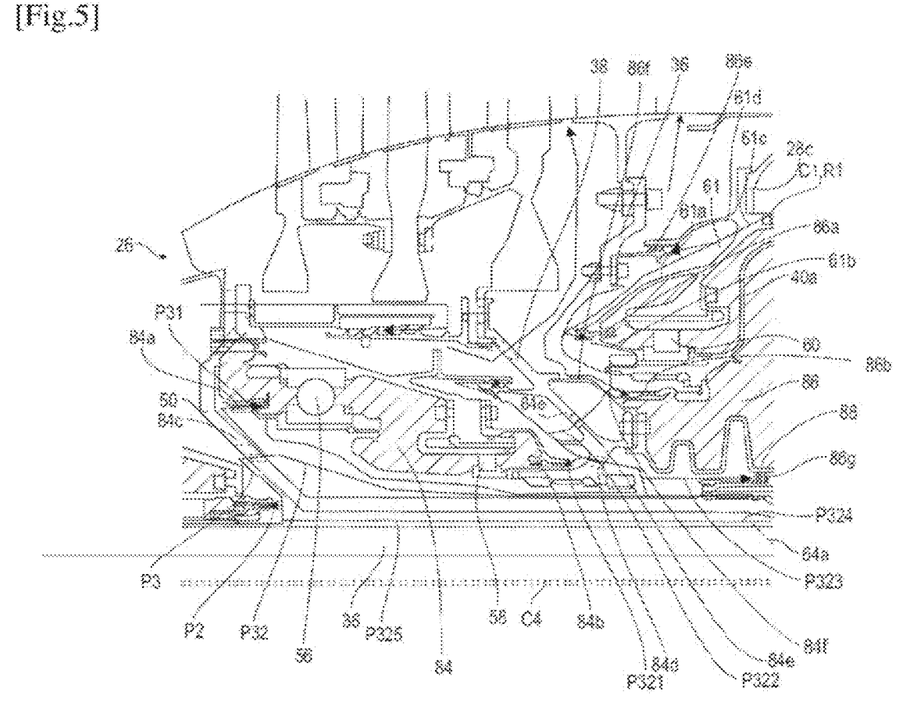
FIG. 5 is a larger scale view of a portion of FIG. 4.

The bearing 34, for example with rollers, is housed in a lubrication chamber 82 which is located substantially in line with the casing 26, and delimited by an annular support 37 of this bearing and the high-pressure shaft 30 (FIG. 4). This annular support 37 is attached to the casing 26. This chamber 82 can be sealed at its terminals by means of two dynamic annular seals 82a, 82b, respectively upstream and downstream, such as an upstream seal of the SRJ type (segmented radial seal) and a downstream labyrinth seal, as shown in FIGS. 4 and 5. These seals are advantageously placed between the annular support 37 and the high-pressure shaft 30.

The bearings 56 and 58, for example ball and roller bearings respectively, are housed in a lubrication chamber 84 which is located between the casing 26 and the reduction gear 42 and which is delimited by at least one annular support 57 of these bearings and the second turbine shaft 38. This chamber 84 can be sealed at its terminals by means of two dynamic annular seals 84a, 84b, upstream and downstream respectively, such as labyrinth seals, as shown in FIGS. 4 and 5. The upstream annular seal 84a is advantageously placed between the part 50 and the second turbine shaft 38. The downstream annular seal 84b is advantageously located between the annular support 57 and the second turbine shaft 38.

Figure 6:
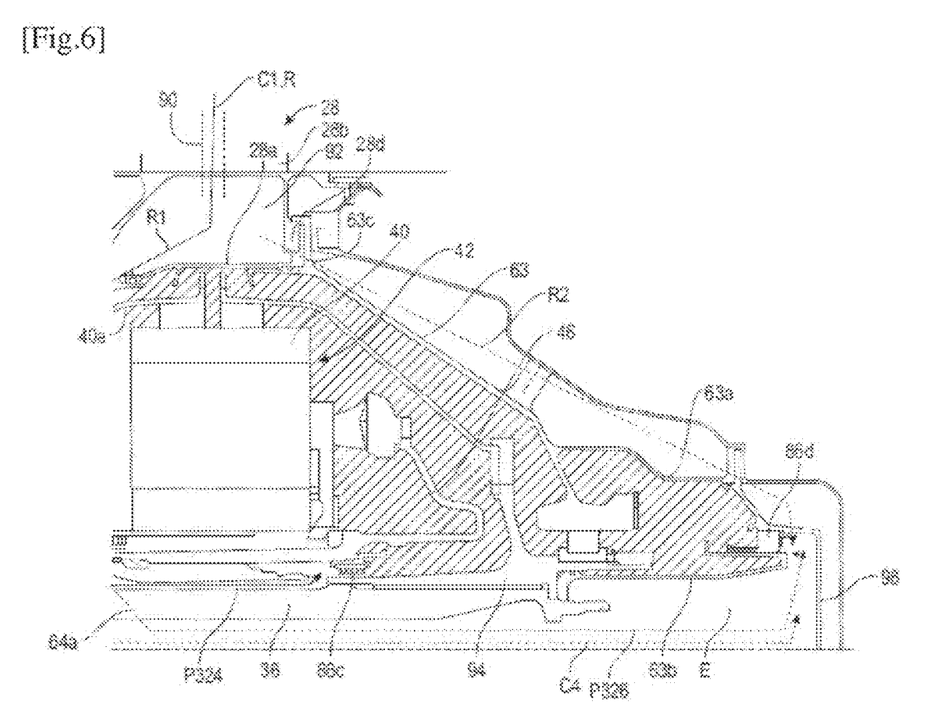
FIG. 6 is a larger scale view of another portion of FIG. 4.

The reduction gear 42 and the bearings 60 and 62, for example roller bearings, are housed in a lubrication chamber 86 which is located in line with the casing 28, and which is delimited at least by annular supports 61, 63 of these bearings. This chamber 86 may be sealed at its terminals by means of a plurality of dynamic annular seals 86a-86d, as shown in FIGS. 4 and 6. The references 86e and 86f designate purges.

FIG. 3 also illustrates the circuits C1, C2 for pressurizing the terminals of the chambers 80-86. A first pressurization circuit C1 extends mainly outside the turbine duct, and a pressurization circuit C2 extends radially inside the turbine duct.

The circuit C1 is used to convey pressurized air to certain seals of the chamber 86, specifically one or two seals of the chamber 86. This circuit C1 comprises means for collecting pressurized air, preferably upstream of the high-pressure compressor 16, in the area Z1 of FIG. 3. This area Z1 is located at the external periphery of the flow duct in the compressor 16.

The circuit C2 is used to convey pressurized air to at least some of the seals of the chambers 80, 82, and 84, and is further used to convey pressurized air to the seals of the chamber 86 that are not fed with pressurized air from the circuit C1, specifically one seal in the chamber 80, the two seals of the chamber 82, the two seals of the chamber 84, and three to four seals of the chamber 86. This circuit C2 comprises means for collecting pressurized air, preferably upstream of the high-pressure compressor 16, in the area Z2. This area Z2 is located at the internal periphery of the flow duct in the compressor 16.

FIG. 3 shows a third air circuit C3.

The compressor of the turbomachine is mainly used to feed air to the combustion chamber and collections are made to feed the secondary systems: cabin air supply, de-icing, pressurization of the chambers, ventilation, purging, etc.

The air circulating in the duct is hot and at high-pressure in the high-pressure portions, so it is necessary to cool the elements in the duct and to limit the leakage outside the duct towards certain parts or chambers that cannot resist the heat. At each turbine stage, the air is expanded and its heat decreases and becomes more acceptable in the last stages. For the ventilation, a ventilation circuit passes through the casings through the duct and in the vanes, which allows to cool them by convection. The purpose of the purges is to prevent duct air from entering into the sub-duct cavities between the vanes and the casings by opposing a purge flow at the level of the junctions between vanes and casing.

The pressure and flow rate requirements for ventilating and purging are greater than for pressurizing the chambers given their uses. These functions are therefore made by the specific C3 circuit fed by the last compressor stages, where the pressure is the highest.

The C3 circuit comprises means for collecting pressurized air, preferably downstream of the high-pressure compressor 16, in the Z3 area. As the air is collected downstream of the HP compressor 16, it is at high-pressure and allows to make the purge between the wheels of the turbine to prevent air from the turbine duct from entering the cavities under the turbine. This air is used in particular to cool the rotors of the high-pressure compressor and is re-injected into the duct, preferably upstream of the last movable wheel of the counter-rotating turbine 22 (FIG. 4), in order to make the purge between the last wheels of the turbines 22a and 22b.

Reference is now made to FIGS. 4 to 6, which show a more concrete example of embodiment of the invention, in the context of the pressurization of the chambers 82-86 located downstream of the turbomachine 10.

With respect to the chamber 82, the circuit C2 is configured to convey the collected pressurized air P from upstream to downstream between the shaft 36 and the high-pressure shaft 30. A portion P1 of this air passes through openings 82c formed in the high-pressure shaft 30 to feed the upstream seal 82a, and another portion P2 of this air directly feed the downstream seal 82b.

The seal 82a is located upstream of the bearing 34, between a support and the high-pressure shaft 30. The seal 82b is located downstream of the bearing 34, between the support 37 and the shaft 30.

With respect to the chamber 84, another portion P3 of the air conveyed by the circuit C2 is intended to pass through openings 84c of the wall 50 that connects the casing 26 to the planet carrier 46 of the reduction gear 42. This portion P3 subdivides to give a portion P31 which feeds the upstream seal 84a and a portion P32 which subdivides again into sub-portions, one sub-portion P321 of which is intended to pass through openings 84d of the second turbine shaft 38 to join the downstream seal 84b.

The seal 84a is located upstream of the bearings 56, 58, between the second shaft 38 or a shaft coupled to said second shaft 38, and to the aforementioned wall 50. The seal 84a is located just downstream of the casing 26, substantially in line with seal 82b. It is located upstream of the trailing edge of the upstream turbine wheel of the rotor 22b.

The seal 84b is located downstream of the bearings 56, 58, between the second shaft 38 and the annular support 57 of these bearings. The seal 84b is located substantially in the middle of the counter-rotating turbine 22, upstream of the reduction gear 42. It is located downstream of the leading edge of the downstream turbine wheel of the rotor 22b.

The oil chamber is thus adapted to contain bearings positioned underneath all the wheels of the turbine rotor 22b.

The chamber 86 is more complex and delimited by several members between which are located several dynamic seals.

The chamber 86 is first delimited by the casing 28, or a wall 28a carried by this casing 28. This casing 28 comprises arms 28b extending downstream of the turbine duct, at least one of which is tubular and receives in its internal cavity a conduit 90 for conveying pressurized air from the first circuit C1. The collected air is conveyed from upstream to downstream by the circuit C1 and is noted R. In some configurations there may be two or three arms, with as many cavities and conduits.

The conduits 90 are for example three in number and are evenly distributed around the axis of the turbomachine 10. They are preferably insulated to prevent the pressurized air from being heated by passage in the arms 28b of the casing 28.

The wall 28a extends around the reduction gear 42 and radially inside the arms. It is attached upstream, along with the bearing support 61, to an upstream attachment flange 28c of the casing 28. This first support 61 carries the external ring of the bearing 60, the internal ring of which is attached to the first turbine shaft 36, which is attached to the ring gear 40 and to the ring gear carrier 40a of the reduction gear 42.

Upstream, the chamber 86 is delimited by two shrouds 61a, 61b integral respectively with the bearing support 61 and the external ring of the bearing 60, and between which is provided a labyrinth seal 86*a* pressurized by the first circuit C1. A portion R1 of the collected air R is conveyed to this seal 86*a* passing through openings 61*c* in the support 61. These openings 61*c* are in fluidic communication with the radially internal ends of the aforementioned conduits 90, by means of an annular pressurized air flow cavity 92 provided between the casing 28 and the wall 28*a*. The portion R1 may further feed air to another labyrinth seal 86*e* located between another upstream shroud 61*d* of the support 61 and the first turbine shaft 36.

However, the cavity 92 is optional. The conduits 90 can be directly connected to the openings 61*c*. The air is then homogenized within the conduits.

The chamber 86 is also delimited by the first shaft 36 and the input shaft 88 of the reduction gear 42, which extends between the second shaft 38 and the sun gear 44 of the reduction gear. A labyrinth seal 86*b* is located between the shafts 36, 38 or between the shafts 36, 88, and is fed with pressurized air by a portion P322 of the circuit C2. P322 represents one of the subdivisions of the portion P32, which, in addition to pass through the openings 84*d*, passes through openings 84*e* and 84*f* of the second shaft 38 (FIG. 5).

The purges 86*e* and 86*f*, visible in particular in FIG. 5, define purge flow rates that prevent duct air from entering the chamber 86. The sealing 86*e* between the exhaust casing and the first shaft 36 allows air from the circuit C1 to flow towards the sealing 84*b* in a space between the exhaust casing and the first shaft 36. The air escaping from the sealing 86*e* assists in purging between the last turbine rotor 22*a* and the exhaust casing 28. Before reaching the sealing 84*b*, the circuit C1 passes through a space between the shafts 36 and 38 circumscribed by the sealing 86*f* between the shafts 36 and 38 and then the circuit C1 passes through the second shaft 38 at 84*e*. The opening 84*e* faces the sealing 84*b* in a space circumscribed by a sealing between the second shaft 38 and the annular support 57.

The chamber 86 is further delimited by a portion of the planet carrier 46 that extends radially inwardly from the reduction gear 42 and from the input shaft 88. A segmented dynamic seal 86*g* is located between the input shaft 88 and the upstream end of the planet carrier 46 and is fed with pressurized air from the subdivision P323 of the circuit C2.

The chamber 86 is also delimited by the shaft 36 or by a trunnion 94 coupled to the end of this shaft. A dynamic labyrinth seal 86*c* is located between the shaft 36 or the trunnion 94, on the one hand, and the planet carrier 46, on the other.

The trunnion 94 or the shaft 36 carries the internal ring of the bearing 62, the external ring of which is carried by the bearing support 63 attached, together with the downstream end of the wall 28*a*, to a downstream annular flange 28*d* of the casing 28. This bearing support 63 delimits the chamber 86 downstream of the reduction gear 42 and comprises a downstream shroud 63*a* that extends downstream of the bearing. A seal 86*d* of the SRJ type is located between the downstream end of this shroud 63*a* and another shroud 63*b* integral with the trunnion 94 or the shaft 36.

The seal 86*d* can be fed with pressurized air, on the downstream side opposite the chamber 86, in several ways.

A first way to pressurize the seal 86*d* consists in using a portion R2 of the collected air R from the first circuit 61 and conveying it from the cavity 92 to through openings 63*c* in the bearing support 63, and then to the seal 86*d* (dashed lines R2 in FIG. 6).

Another way is to use another subdivision of the portion P32, noted P325. This portion P325 comprises a subdivision P324 which feeds the seal 86*c* and another subdivision P326 which is intended to pass through openings 64*a* of the shaft 36 and then be conveyed to the seal 86*d* (see FIGS. 4 to 6).

Finally, another way is to use another circuit C4, the air of which would be collected at the level of the low-pressure compressor 14, and which would be conveyed from upstream to downstream inside the shaft 36 to the seal 86*d*. In this case, the downstream longitudinal end of the shaft 36 would be open, as illustrated in FIGS. 4 and 6, and would open into an annular space delimited outside by the shroud 63*b* and downstream by a cover 98 added to this shroud.

Figure 7:
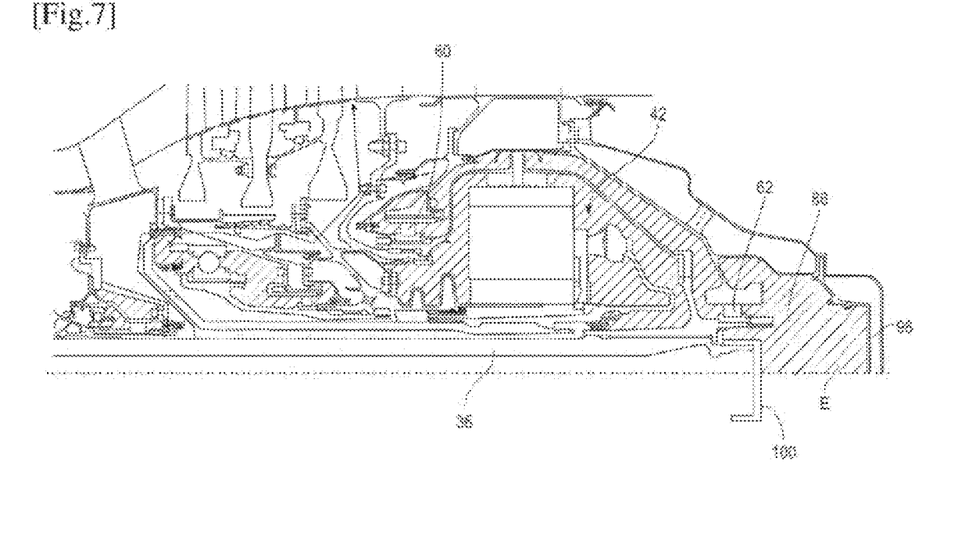
FIG. 7 is a similar view to that of FIG. 4 and illustrates an alternative embodiment.

In the alternative embodiment shown in FIG. 7, the seal 86*d* would be omitted. The chamber 86 would then be delimited downstream by the shroud 63*b*, the cover 98, as well as a cap 100 added and attached to the downstream end of the shaft 36 in order to isolate the above-mentioned space E from the interior of the low-pressure shaft in a sealed manner. The space E would then be an integral portion of the chamber 86.

The choice of the type of chambers is essential to the architecture of the ventilation because it directly impacts the circuits that will have to ventilate the chambers. For this purpose, an architecture of the "not vented" type was chosen for the chambers 82 and 84. Indeed, the "not vented" chambers are dimensioned for a very low air flow rate, which allows hotter air to pass through the terminals of the chamber, but also allows a smaller quantity of air to be brought in, and consequently smaller passage cross-sections for the pressurization circuit C2. In addition, since there is no venting, oil losses in the oil separator and oil consumption of the engine are reduced. The counterpart of the "not vented" chamber is that the oil recovery pump must be sized to the suction of the air and oil present in the chamber, so a very large recovery pump is required.

For the chamber 86, the choice of chamber is imposed by the number of sealings of this chamber. The "not vented" chamber is feasible with a maximum of two sealings at the terminals of the chamber. Beyond that, it is necessary to integrate a venting of the chamber. Consequently, the chamber 86 is a vented chamber with the venting passing through the arms of the casing 28. It is necessary that the flow rate of the circuit C1 can be calibrated by means of holes or tubes whose diameters can be controlled and whose passage cross-section does not depend on the operation or the state of deterioration of the turbomachine. This is why the air in this circuit passes through no sealing, whose passage cross-sections are too dependent on the operating state of the engine. In the case of this circuit C1, the flow rate is adjusted via the passage sections located under the casing 28.

The invention claimed is:

1. A turbomachine with counter-rotating turbine for an aircraft, comprising:
    a high-pressure body comprising a high-pressure compressor rotor and a high-pressure turbine rotor, these rotors being connected by a high-pressure shaft,
    a low-pressure counter-rotating turbine, a first rotor of which is configured to rotate in a first direction of rotation and is connected to a first turbine shaft, and a second rotor of which is configured to rotate in an opposite direction of rotation and is connected to a second turbine shaft the first rotor comprising turbine wheels interposed between turbine wheels of the second rotor,
    a mechanical reduction gear with epicyclic gear train of the planetary type which comprises a sun gear driven in rotation by said second shaft, a ring gear driven in rotation by said first shaft, and a planet carrier attached to a first stator casing of the turbomachine located upstream of the counter-rotating turbine with respect to a direction of flow of the gases in the turbomachine, first bearings for guiding said first turbine shaft, these first bearings being carried by at least one bearing support attached to a second stator casing located downstream of the counter-rotating turbine, wherein the reduction gear and said first bearings are housed in a first lubrication chamber fed with oil and comprising dynamic seals, and in that the turbomachine comprises:

a first circuit for pressurizing at least one of said seals, the first circuit being configured to convey pressurized air from the external periphery of the high-pressure body to the external periphery of said second casing and then from the external periphery of that casing to its internal periphery and said at least one of said seals, and a second circuit for pressurizing at least one other of said seals, the second circuit being configured to convey pressurized air from the internal periphery of the high-pressure body to the internal periphery of said reduction gear and said at least one other of said seals, passing within said second shaft.

2. The turbomachine of claim 1, wherein said first circuit is configured to feed air to at least one first seal, and possibly also to another seal.

3. The turbomachine according to claim 1, wherein said first circuit comprises at least one air conduit, preferably heat-insulated, passing through at least one tubular arm of said second casing.

4. The turbomachine according to claim 2, wherein the first seal is formed between said first shaft and an annular support of one of the first bearings for guiding the first shaft said first circuit comprising through openings formed in this support, these openings feeding said first seal and opening into an annular cavity which is surrounded by said second casing and which is in fluidic communication with said at least one conduit.

5. The turbomachine according to claim 2, wherein said other seal is formed between said first shaft or a low-pressure shaft coupled to this first turbine shaft, and an annular support of one of the first bearings for guiding the first shaft, said first circuit comprising through openings formed in this support and feeding this other seal.

6. The turbomachine according to claim 2, wherein said second circuit is configured to feed air to a second seal and a third seal, or even also to a fourth seal.

7. The turbomachine of claim 6, wherein said second circuit comprises through openings formed in an element for connecting said first casing to the planet carrier of the reduction gear.

8. The turbomachine according to claim 6, wherein said second seal is formed between said first and second turbine shafts, said second circuit comprising through openings formed in this second shaft for feeding this second seal.

9. The turbomachine according to claim 6, wherein said third seal is formed between said first shaft or a low-pressure shaft coupled to this first turbine shaft, and the planet carrier of the reduction gear or an element integral with this planet carrier, said second circuit comprising air passages formed in the planet carrier or this element, or between the planet carrier and this element to feed this third seal.

10. The turbomachine according to claim 6, wherein said fourth seal is formed between said first shaft or a low-pressure shaft coupled to this first turbine shaft, and an annular support of one of the first bearings for guiding the first shaft.

11. The turbomachine of claim 10, wherein said second circuit comprises at least one through opening formed in said low-pressure shaft and/or in a fan shaft coupled to the low-pressure shaft and configured to drive a fan of the turbomachine, to feed the fourth seal.

12. The turbomachine according to claim 10, wherein said fourth seal is not fed with air from the second circuit, a cap being attached to the downstream end of said low-pressure shaft so that the fourth seal is located between two annular spaces intended to be at a same pressure during operation.

13. The turbomachine according to claim 1, wherein said first and second circuits are configured to collect air from upstream of the high-pressure compressor or from this high-pressure compressor.

14. The turbomachine according to claim 1, wherein it further comprises second bearings for guiding said second shaft, these second bearings being carried by at least one bearing support attached to said first stator casing, said second bearings being housed in a second lubrication chamber fed with oil and comprising dynamic seals fed with air from said second circuit.

15. The turbomachine according to claim 1, wherein said first shaft is coupled to a low-pressure shaft which is guided in rotation by at least one bearing carried by an annular support attached to said first casing, this bearing being housed in a third lubrication chamber fed with oil and comprising dynamic seals fed with air from said second circuit.

* * * * *